Figure 1:
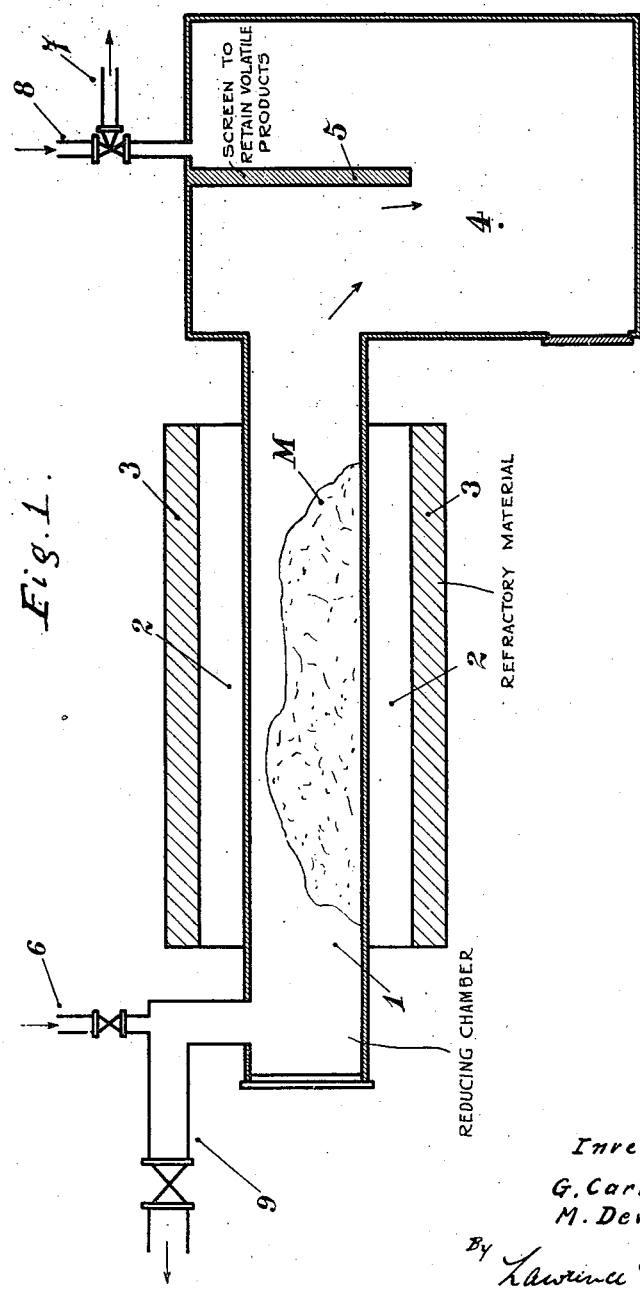

Patented Mar. 3, 1925.

1,528,319

UNITED STATES PATENT OFFICE.

GEORGES CARTERET, OF BOULOGNE, AND MAURICE DEVAUX, OF PARIS, FRANCE.

PROCESS FOR THE PREPARATION OF OXYGENATED COMPOUNDS OF TITANIUM AND PIGMENTS CONTAINING SAID COMPOUNDS.

Application filed July 19, 1921. Serial No. 485,934.

*To all whom it may concern:*

Be it known that we, GEORGES CARTERET and MAURICE DEVAUX, citizens of the Republic of France, residing at Boulogne and Paris, France, respectively, have invented a new and useful Improvement in Processes for the Preparation of Oxygenated Compounds of Titanium and Pigments Containing Said Compounds; and we do hereby declare the following to be a full, clear, and exact description of the same.

One object of the invention is,

The commercial preparation and purification of titanium chloride $TiCl_4$.

Other objects are the preparation of oxygenated compounds of titanium such as the sulphate, hydrated oxide, anhydrous oxide.

While a further object is the preparation of pigments compounded with the oxygenated salts of titanium.

With these and other objects in view, which will become apparent as the description proceeds, the invention resides in the following description and is claimed in the appended claims.

The processes known and utilized hitherto for the preparation of oxygenated compounds of titanium are based on treating the ore (rutile or titanic iron) either with strong acids, alkali sulfates or carbonates. The result is that great difficulties are encountered in completely separating the iron from the titanic oxides; in fact, it is necessary to boil considerable masses which are, either very dilute, or concentrated, and in the latter case there is a partial reduction of the iron and titanium salts. Furthermore, in such processes an enormous quantity of sulfuric acid is consumed.

The present invention is based on the facility with which it is possible to obtain by distillation, pure titanium chloride, by utilizing its fixed boiling point, about 135° C., which is substantially different from the boiling points of the other chlorides.

This chloride, soluble in water, may be decomposed either into oxychloride, or into oxide or hydrate of gelatinous titanium, which, washed, dried, and calcined, will give a very white titanium oxide, free from all trace of iron.

The gelatinous hydrate or oxide which is soluble in powerful acids may be re-precipitated by ebullition or by neutralization.

The chlorination of ore by the classic method of Dumas (crushing the ore with oil and carbon, calcination and action of the chlorine at red heat) is known, but has not hitherto been applied to titanic irons. Such chlorination may be effected industrially with the process forming the subject of the present invention by subjecting the titanic ores in one apparatus to:

First, preliminary reduction,

Second, two chlorinations made successively in one direction, then in another direction of the apparatus and at different temperatures according to the direction of the chlorine current. These successive chlorinations are for the purpose of separating the iron and titanium contained in the ore treated, and Third, distillation at 135° C. of the impure titanium chloride thus obtained.

The process is carried out in the following manner:

*Reduction.*—The finely crushed ore is utilized either as such or agglomerated in briquettes or balls by means of a fatty or tarry material (oils, tar oils, tar, pitch) with the optional addition of pulverized carbon (powdered wood charcoal or coal) and is subjected to reduction in the furnace or in the crucible itself which is to serve for the final chlorination.

This reduction can be effected by two methods:

(*a*) If the ore is admixed with carbon (5 to 10%) the furnace or retort (crucible) containing said ore is purged of air by a current of reducing gas, such as hydrogen, carbon monoxide, water or generator gas, after which all air entrances being sealed except a small opening for the exit of the gases produced, and the temperature is raised and maintained at about 800° C. for one or two hours.

(*b*) If the ore is not admixed with carbon the furnace or crucible containing the ore is evacuated of air by a current of reducing gas, and the temperature is raised under the same conditions as above indicated, but in the presence of a slow current of reducing gas for the entire duration of the reduction.

When the reduction is terminated, the charge is permitted to cool in a closed vessel, and a current of dry chlorine, or other halogen gas, is introduced by the new process which is one of the characteristic features of the present invention.

*Chlorination.*—The furnace or retort, of whatever form, is provided with two openings 6 and 7, between which the ore is placed. Each of these openings communicates with containers suitable for the reception of the chlorination products.

The furnace or retort is heated to a temperature of about 350° C., the chlorine entering, for example, through opening 6. The iron only is attacked at this temperature and is rapidly sublimed to the form of ferric chloride passing through opening 7. At the end of a period which varies with the dimensions of the furnace and the quality of the ore, almost all the iron is eliminated. The direction of the current of chlorine is then reversed entering through 7. The temperature is raised to 550–600° C. and the titanium chloride, contaminated with traces of iron, silicon, etc., passes through opening 6 into the condensation receptacles connected to 6.

Figure 2:
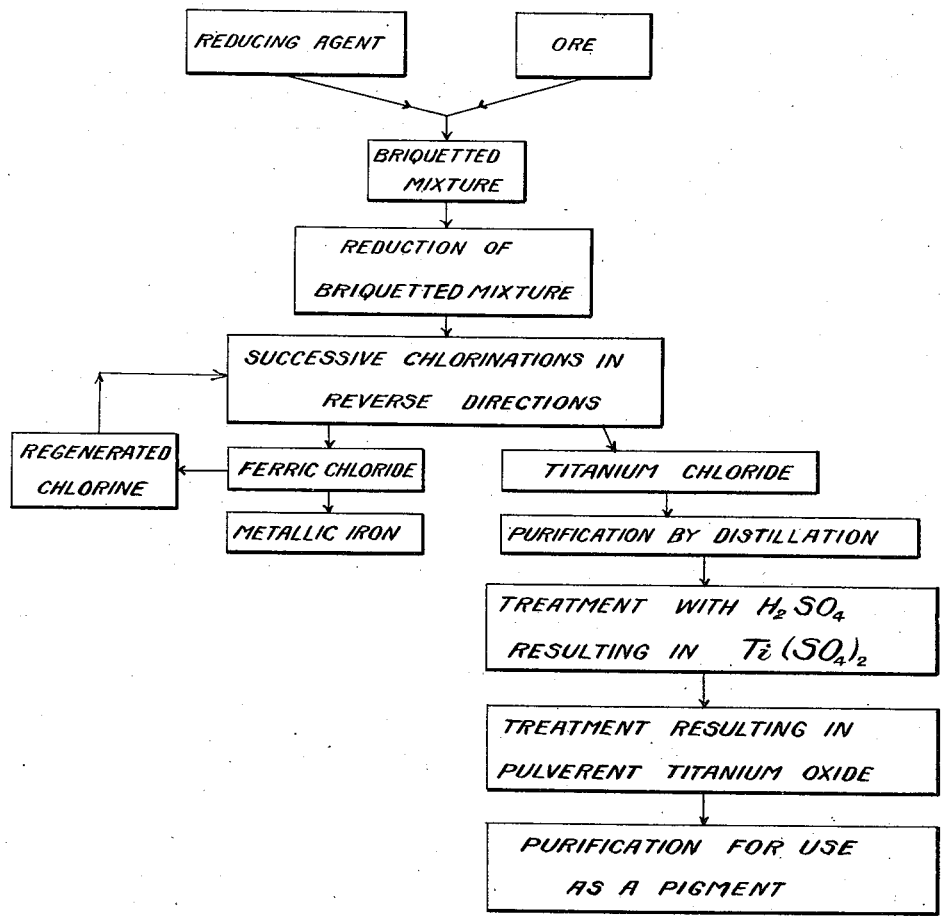

In the accompanying drawing, Fig. 1 illustrates a retort suitable for the process outlined, and Fig. 2 is a flow sheet.

In Fig. 1 the retort is shown comprising a cylindrical receptacle 1 of refractory material, into which the ore and the reducing mixture M are introduced. Cylinder 1 is surrounded by a heating chamber 2 with an outer covering 3 of refractory brick, and this receptacle 1 connects with another likewise cylindrical receptacle 4, of greater capacity, the axes of the two cylinders forming a right angle.

In the first step of the operation, or during reduction of the ore, all the ports of the apparatus are closed with the exception of the opening 7, through which the excess gases are permitted to escape.

This reduction terminated, cooling is effected in a closed vessel. The retort being opened at 6 and at 7, chlorine is introduced into 6, the retort being heated to a temperature of 350° C. The iron contained in the ore is thus attacked and is rapidly sublimated to ferric chloride passing through the opening 7.

It is sometimes of advantage to provide the vertical part 4 of the retort with a screen 5 for retaining the ferric chloride.

As soon as it is estimated that almost all of the iron is thus eliminated, the current of chlorine is reversed, being passed in at this moment through 8, the port 6 being closed.

The temperature is raised to 550–600° C. and the titanium chloride thus formed is carried through 9 into the condensation receptacles connected thereto (not shown on the drawing).

*Purification.*—The impure titanium chloride is conducted into a simple distilling apparatus permitting of collecting the chloride $TiCl_4$, which distills over at about 135° C.

The distillation residue is treated for the recovery of the metals contained therein.

*Treatment of the ferric chloride.*—The ferric chloride obtained separately is separated out, either dry for the regeneration of the chlorine under the influence of heat, or by lixiviation to electrolytically regenerate the chlorine which is re-used in the manufacture, and to recover the iron contained. For this purpose use is made of a known reaction which consists in reducing the ferric chloride, thus obtained in solution, by contact with a natural or artificial iron sulfide, according to the classic reaction:

$$Fe_2Cl_6 + FeS = 3FeCl_2 + S.$$

This reaction favored by boiling permits of the separation of the sulfur by filtration and the extraction of the chlorine and iron by electrolysis of the ferrous chloride, which is a characteristic feature of this invention.

*Preparation of oxygenated salts of titanium.*—The titanium chloride, distilled and pure, may be treated, due to its preparation, in different ways:

1. To obtain titanium sulfate and oxide: The chloride may be dissolved gradually, cold, as desired, in dilute sulfuric acid. The reaction:

$$2(H_2SO_4) + TiCl_4 = Ti(SO_4)_2 + 4HCl$$

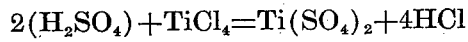

shows that a considerable proportion of hydrochloric acid is evolved. It is the same with the solid oxychloride which the chloride forms in contact with moist air or steam.

This concentrated solution may be used for the preparation of titanium sulfate by evaporating at low temperature. It may also serve for the preparation of metatitanic oxide or acid which is precipitated by aqueous dilution and boiling. The hydrochloric acid which evolves during the reaction and during the heating of the solutions is recovered by means of an alkali solution of soda or potash. The alkaline chloride formed is electrolytically treated to regenerate the chlorine and the alkaline washing liquid, both of which are again used in the manufacture.

The sulfuric solution coming from the preparation of the titanium oxide is decanted and may receive a fresh quantity of titanium chloride, so that by these recoveries of chlorine, alkalies, acids, the process is cyclic, which is a characteristic feature of the invention.

2. Preparation of the hydrated or gelatinous oxide of titanium: The titanium chloride is dissolved in cold water and the solution obtained is neutralized by means of a carbonate or alkali oxide or alkaline earth, according to the following reactions:

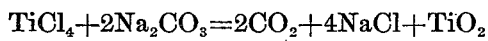

or

At the point of neutralization the hydrated oxide of titanium coagulates rapidly and the liquor (alkali chloride) is electrolytically treated for the recovery of the chlorine and the alkali.

This gelatinous oxide is ready for various conversions as follows:

Preparation of various titanium salts by solution in the acid corresponding to the salt desired.

Preparation of crystalline titanium oxide by drying at 100° C., washing, filtering and calcining at bright red heat.

Preparation of fine titanium oxide for any application and particularly for use as a pigment.

The latter application is done in the following manner:

The gelatinous oxide is dissolved in sulfuric acid, more or less concentrated (an average content of 25% of $H_2SO_4$ appears to be the best proportion), the whole being then carried to boiling. Slight hydrogenation is useful to facilitate the precipitation of the $TiO_2$, which is done either by mixing with hydrogen with or without pressure, for example with the hydrogen produced in the above indicated electrolytical recovery processes, or by the addition of a small amount of zinc which yields nascent hydrogen and forming a little zinc sulfate which will be eliminated by washing. This hydrogenation is one of the characteristic features of the invention.

The dilute sulfuric acid, obtained by decantation and by washing the oxide precipitated by the boiling is concentrated and again serves to dissolve fresh quantities of gelatinous oxide.

The above indicated process with hydrogenation is also applicable to sulfuric solutions obtained directly from titanium chloride; its application to the solutions of titanium free from iron is novel and is one of the characteristic features of the invention.

*Pigments.*—The amorphous oxide obtained by these methods is perfectly suited for the preparation of pigments for dyeing or other uses. For this purpose it is necessary to saturate both the natural as well as the residual acidity of the titanic oxide precipitated from sulfuric solutions and washed.

*Saturation of titanic oxide.*—Use may be made of an alkaline earth carbonate, but the use of these carbonates, which are insoluble salts under these conditions, presents the defect of converting them into likewise insoluble sulfates, and thus of producing more unconverted, hard particles, rendering the final pigment less homogeneous, at least than the use of precipitated and very pure carbonates.

It is preferable to use for this alkaline earth chlorides in solution which, on contact with the residual sulfuric acid, give: 1. Alkaline earth sulfates which are precipitated in powdered form and 2. Free hydrochloric acid which is easier to eliminate, this being effected by washing followed by drying and calcination or, better, by saturation with milk of lime or baryta water followed by washing and final drying.

The decantation and washings thus give either a solution of hydrochloric acid which, passed to the alkaline earth carbonate or oxide, provides the chloride solution necessary for a new operation, or, directly, a solution of alkaline earth chloride likewise adapted for re-use.

The following is a brief summary of the successive steps of the operation of the process:

1. Reduction of the ore in a reducing atmosphere of 800° C.
2. Successive chlorination operations performed in reverse directions through the retort.
3. Treating the ferric chloride to regenerate the chlorine.
4. Purifying the titanium chloride by distillation.
5. Production of titanium sulfate:—
Treating the distilled titanium chloride with sulfuric acid.
6. Production of pulverulent titanium oxide by boiling a solution of titanium sulfate, said boiling being followed by a hydrogenation and a decantation, washing with water and calcination of the precipitate.
7. Production of pigments:—
Neutralizing the traces of sulfuric acid contained in the titanium oxide by an alkaline earth salt, said neutralization being completed by washing the pulverulent oxide with lime or barytes water.

Having thus described the invention, what is claimed as new is:

1. A cyclic process for treating titanium ores containing iron, comprising heating in a reducing atmosphere, passing successive currents of halogen gas through the ore, in opposite directions, and at different temperatures, whereby the iron and titanium halogen compounds are volatilized, separately collecting the halogen compounds, and treating the latter to regenerate halogen gas for use in the halogenation step.

2. A cyclic process of treating titanium ores containing iron, comprising heating in a reducing atmosphere, passing successive currents of chlorin gas through the ore, in opposite directions, and at different temperatures, whereby the iron and titanic chloride are volatilized, separately collecting the chlorids, and treating the latter to regenerate chlorin for use in the chlorination-step.

3. A cyclic process of treating titanium ores containing iron, comprising finely crushing the ore, heating in a reducing atmosphere, passing successive currents of chlorin gas through the ore, in opposite directions and at different temperatures, whereby the iron and titanic chlorids are volatilized, separately collecting the chlorids, and treating the latter to regenerate chlorin for use in the chlorination-step.

4. A cyclic process of treating titanium ores containing iron, comprising heating in a reducing atmosphere, passing successive currents of chlorin gas through the ore at temperatures of 350° and 550° to 600° C., to volatilize the iron and titanic chlorid respectively, separately collecting the chlorids and treating the latter to regenerate chlorin for use in the chlorination-step.

5. A cyclic process of treating titanium ores containing iron, comprising heating in a reducing atmosphere, passing successive currents of chlorin gas through the ore, in opposite directions and at different temperatures, whereby the iron and titanium chlorids are volatilized, separately condensing the chlorids, distilling the titanium chlorid to separate therefrom traces of other chlorids, and thereafter treating the chlorids to regenerate chlorin for the chlorination step.

6. A cyclic process of treating titanium ores containing iron, comprising heating in a reducing atmosphere, passing successive currents of dry chlorin gas through the ore, in opposite directions and at different temperatures, whereby the iron and titanium chlorids are volatilized, separately condensing the chlorids, distilling the titanium chlorid to separate therefrom traces of other chlorids, and thereafter treating the chlorids to regenerate chlorin for the chlorination step.

7. In the process of treating titanium ores containing iron, the step comprising passing successive currents of chlorin gas through the ore, in opposite directions and at different temperatures, to volatilize and separate the iron and titanic chlorids respectively.

8. A cyclic process of treating titanium ores containing iron, comprising heating in a reducing atmosphere, passing successive currents of chlorin gas through the ore, in opposite directions and at different temperatures, to volatilize the ferric and titanium chlorids respectively, separately collecting the ferric and titanium chlorids, reducing the ferric chlorid to ferrous chlorid, electrolyzing the latter to produce metallic iron and free chlorin for the chlorination-step, purifying the titanium chlorid, treating the latter with sulfuric acid to produce titanium sulfate and hydrochloric acid, treating the titanium sulfate to produce titanic oxid and sulfuric acid, recovering the sulfuric acid for treatment of fresh titanium chlorid, treating the hydrochloric acid with an alkaline reagent to form an alkaline chlorid, and electrolyzing the same to regenerate chlorin for the chlorination-step and alkali solution for the treatment of hydrochloric acid.

9. The process of producing crystalline titanium oxid comprising treating gelatinous oxid in boiling sulfuric acid, adding hydrogen to the solution to facilitate the precipitation of titanic oxid, freeing the latter from the solution, and calcining to produce crystalline titanic oxid.

10. The process of preparing pigments from titanium compounds contaminated with sulfuric acid, comprising partially neutralizing the latter with an alkaline earth salt, thereafter completely neutralizing by washing with an additional agent, and drying the titanic oxid.

11. The process of preparing pigments from titanium compounds contaminated with sulfuric acid, comprising partially reacting upon the latter with an alkaline earth chlorid, thereafter completing the reaction and the neutralization by washing with milk of lime and drying the titanic oxid.

In testimony whereof we have signed our names to this specification.

GEORGES CARTERET.
MAURICE DEVAUX.